(12) United States Patent
Zhang et al.

(10) Patent No.: US 8,788,938 B2
(45) Date of Patent: Jul. 22, 2014

(54) WEB-BASED VIDEO BROWSING

(75) Inventors: Tong Zhang, San Jose, CA (US); Peng Wu, San Jose, CA (US); Sam Liu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2033 days.

(21) Appl. No.: 11/655,566

(22) Filed: Jan. 19, 2007

(65) Prior Publication Data

US 2008/0178086 A1 Jul. 24, 2008

(51) Int. Cl.
G06F 3/00 (2006.01)
(52) U.S. Cl.
USPC ............................ 715/719; 715/716; 715/700
(58) Field of Classification Search
USPC ................................................ 715/719, 205
See application file for complete search history.

(56) References Cited

U.S. PATENT DOCUMENTS

| | | | | |
|---|---|---|---|---|
| 5,664,227 | A * | 9/1997 | Mauldin et al. | 715/203 |
| 5,835,667 | A * | 11/1998 | Wactlar et al. | 386/96 |
| 6,173,317 | B1 | 1/2001 | Chaddha et al. | |
| 6,230,172 | B1 * | 5/2001 | Purnaveja et al. | 715/205 |
| 6,535,639 | B1 * | 3/2003 | Uchihachi et al. | 382/225 |
| 6,631,424 | B1 | 10/2003 | McDonough et al. | |
| 6,782,049 | B1 * | 8/2004 | Dufaux et al. | 375/240.01 |
| 6,791,579 | B2 * | 9/2004 | Markel | 715/719 |
| 2001/0013068 | A1 | 8/2001 | Klemets et al. | |
| 2002/0071651 | A1 | 6/2002 | Wurz et al. | |
| 2002/0135808 | A1 | 9/2002 | Parry | |
| 2003/0009488 | A1 | 1/2003 | Hart | |
| 2003/0033606 | A1 * | 2/2003 | Puente et al. | 725/110 |
| 2003/0122861 | A1 | 7/2003 | Jun et al. | |
| 2003/0212993 | A1 | 11/2003 | Obrador | |
| 2006/0238806 | A1 | 10/2006 | Karaoguz et al. | |

FOREIGN PATENT DOCUMENTS

| | | |
|---|---|---|
| EP | 0782085 A1 | 7/1997 |
| JP | 1996-334120 | 9/1997 |
| JP | 2003-216406 | 7/2003 |

OTHER PUBLICATIONS

Internet Multimedia Management Systems V. Edited by Smith, John R.; Zhang, Tong; Panchanathan, Sethuraman. Proceedings of the SPIE, vol. 5601, pp. 25-35 (2004).*

Supplementary European Search Report dated Feb. 23, 2010 for Application No. 08724624.5-1527, 2 pages.

* cited by examiner

*Primary Examiner* — Tadeese Hailu
*Assistant Examiner* — Darrin Hope

(57) ABSTRACT

A system for web-based video browsing includes a web server and a web client. The web server and the web client cooperatively provide a set of video browsing functions. The video browsing functions enable a user of the web client to browse a source video and select a video frame from the source video. The distribution of the video browsing functions between the web server and the web client may be adapted to a communication speed between the web server and the web client.

10 Claims, 5 Drawing Sheets

WEB-BASED VIDEO BROWSING

BACKGROUND

A wide variety of devices exist that enable creation of videos. Examples of devices that enable creation of videos include video cameras and handheld devices with an integrated camera.

In addition, a variety of web-based services exist that enable individuals to share videos via the Internet. For example, a web site may enable individuals to upload videos so that the videos may be viewed by friends and family.

It may be desirable to offer a web-based video browsing. For example, a web site that enables individuals to share videos may benefit by offering a video printing service that enables clients to browse videos and select individual video frames for printing.

Providing a web-based video browsing may present a number of problems. For example, web clients may connect to a web server using a variety of different network connections that yield different communication speeds. A video browsing and selection system that is adapted to a high speed connection may not work well using a low speed connections, and visa versa. In addition, the source videos from which video frames are selected may include a large number of video frames and browsing large numbers of video frames may impose an undesirable burden on a user.

SUMMARY OF THE INVENTION

A system for web-based video browsing is disclosed including a web server and a web client that cooperatively provide a set of video browsing functions. The video browsing functions enable a user of the web client to browse a source video and select a video frame from the source video without imposing an excessive burden on the user. The distribution of the video browsing functions between the web server and the web client may be adapted to a communication speed between the web server and the web client.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
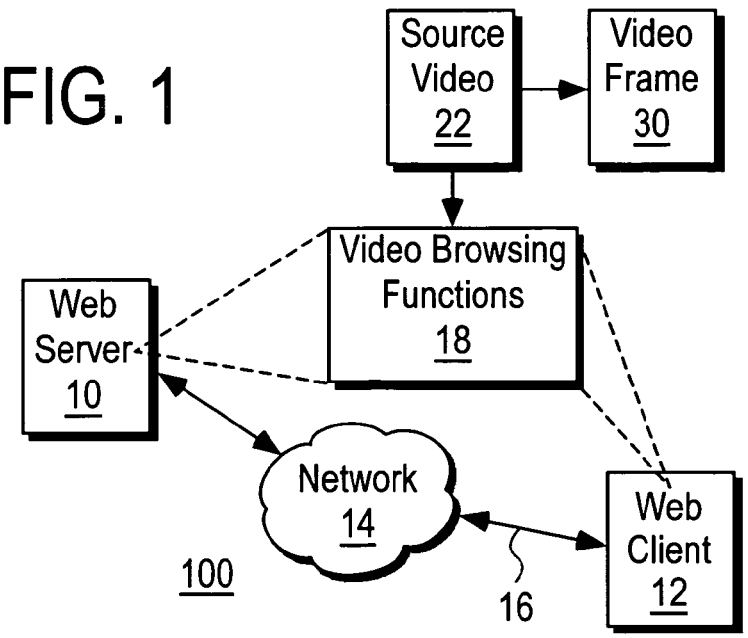
FIG. 1 shows a web-based video browsing system according to the present teachings.

FIG. 1 shows a web-based video browsing system 100 according to the present teachings. The web-based video browsing system 100 includes a web server 10 and a web client 12 that communicate via a network 14 using web protocols. The web server 10 and the web client 12 cooperatively provide a set of video browsing functions 18 that enable a user of the web client 12 to browse a source video 22 and select a video frame 30 from the source video 22. The web-based video browsing system 100 may be part of a web-based video printing service in which the video frame 30 is selected for printing. Other applications for the web-based video browsing system 100 include video books (photo book produced from video frames) and video thumbnailing.

The video browsing functions 18 are distributed among the web server 10 and the web client 12. The distribution of the video browsing functions 18 is adapted to the characteristics of a communication link 16 used by the web client 12 to reach the communicate network 14. The distribution may be selected to enhance the experience of a user of the web client 12. For example, if the communication link 16 has a relatively limited bandwidth then the video browsing functions 18 are distributed among the web server 10 and the web client 12 to minimize bandwidth utilization on the communication link 16. On the other hand, if the communication link 16 has a relatively high bandwidth then the video browsing functions 18 are distributed among the web server 10 and the web client 12 to take full advantage of the available bandwidth of the communication link 16.

Figure 2:
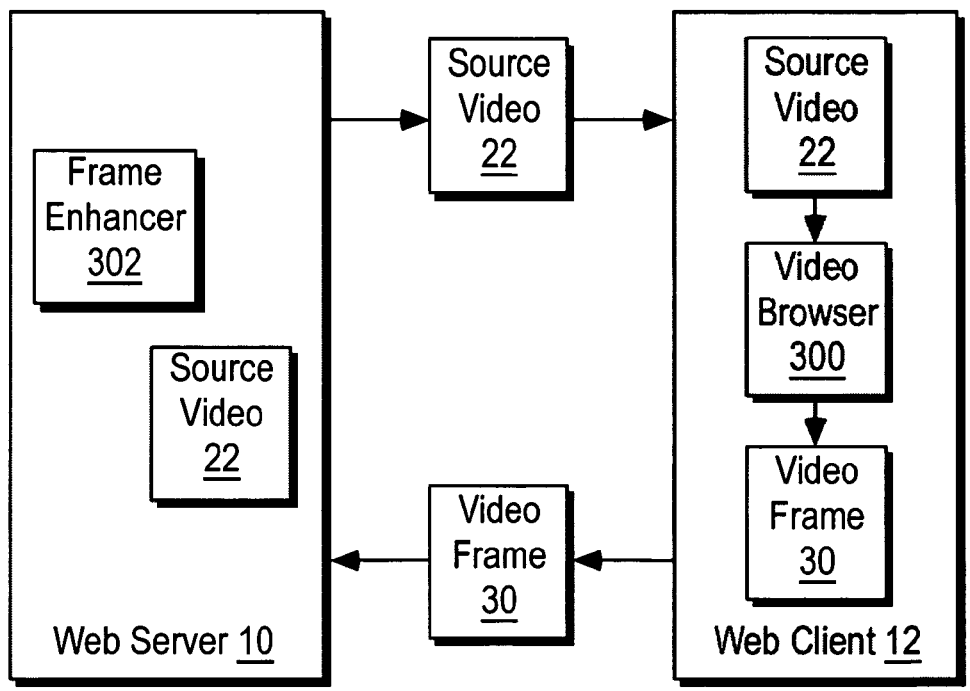
FIGS. 2-6 show example distributions of a set of video browsing functions among a web client and a web server.

FIG. 2 shows a distribution of the video browsing functions 18 in an embodiment in which the source video 22 is stored on the web server 10. The video browsing functions 18 in this example distribution include a video browser 300 located in the web client 12 and a frame enhancer 302 located in the web server 10. The web client 12 downloads the source video 22 from the web server 10. The source video 22 may be downloaded from the web server 10 in real-time or in non-real-time. A user of the web client 12 browses the source video 22 on the web client 12 using the video browser 300. The user selects the video frame 30 from the source video 22 using the video browser 300 and then the video browser 300 uploads the video frame 30 to the web server 10. The frame enhancer 302 enhances the video frame 30 after it is uploaded. Alternatively, the frame enhancer 302 may be located on the web client 12 so that the video frame 30 is enhanced before it is uploaded.

Figure 3:
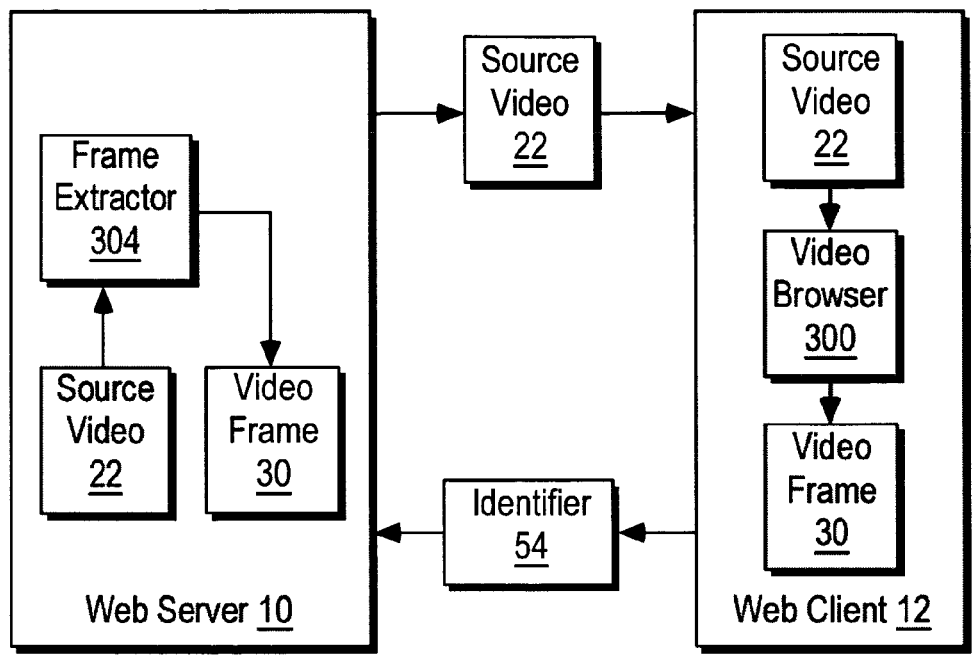

FIG. 3 shows another distribution of the video browsing functions 18 in an embodiment in which the source video 22 is stored on the web server 10. The video browsing functions 18 in this example distribution include the video browser 300 located in the web client 12 and a frame extractor 304 located in the web server 10. The web client 12 downloads the source video 22 from the web server 10 and a user of the web client 12 browses the source video 22 on the web client 12 using the video browser 300 and selects the video frame 30 from the source video 22 using the video browser 300. The video browser 300 then uploads an identifier 54 to the web server 10. For example, the identifier 54 may be a frame index of the video frame 30 within the source video 22. The frame extractor 304 on the web server 10 uses the identifier 54 to extract the video frame 30 from the source video 22 stored on the web server 10.

Figure 4:
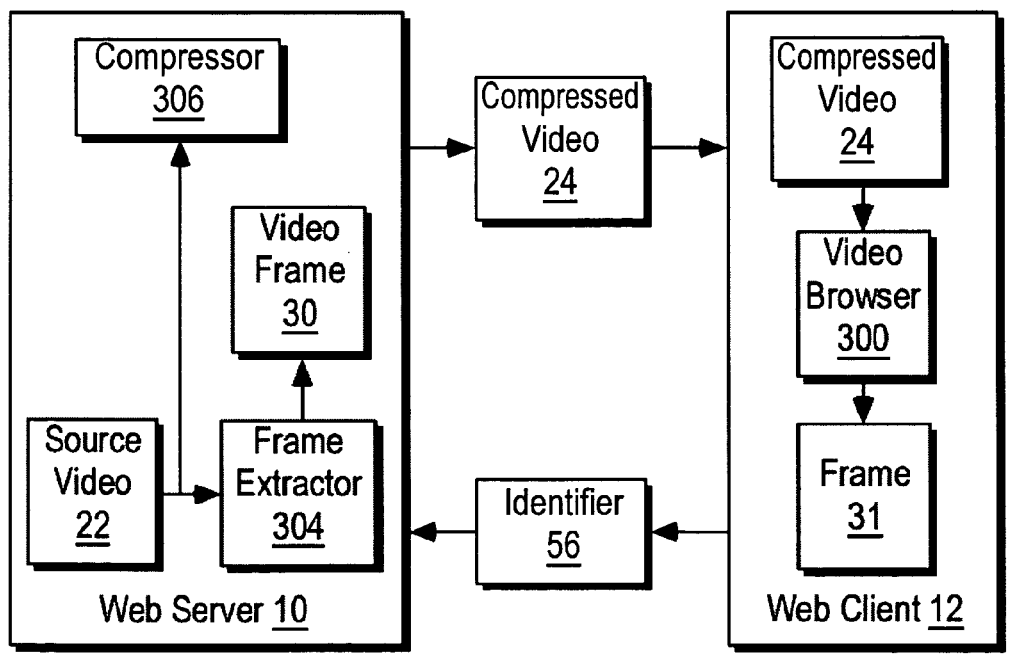

FIG. 4 shows yet another distribution of the video browsing functions 18 in an embodiment in which the source video 22 is stored on the web server 10. The video browsing functions 18 in this example distribution include the video browser 300 located in the web client 12 and the frame extractor 304 located in the web server 10 along with a compressor 306 located in the web server 10. The compressor 306 generates a compressed video 24 and the web client 12 downloads the compressed video 24 from the web server 10. The compressed video 24 is a down-sample of the source video 22. The compressed video 24 may be a down-sample of the source video 22 in frame rate or in frame size. A user of the web client 12 browses the compressed video 24 on the web client 12 using the video browser 300 and selects a frame 31 corresponding to the video frame 30 from the compressed video 24 using the video browser 300. The video browser 300 then uploads an identifier 56 corresponding to the frame 31 to the web server 10. The frame extractor 304 on the web server 10 uses the identifier 56 to extract the video frame 30 from the source video 22 stored on the web server 10. The web server 10 may subsequently send the video frame 30 to the web client 12 such that the web client 12 displays the video frame 30 to a user. This enables a user of the web client 12 to view the video frame 30 in its full resolution before deciding whether or not it should be selected, e.g. for printing.

Figure 5:
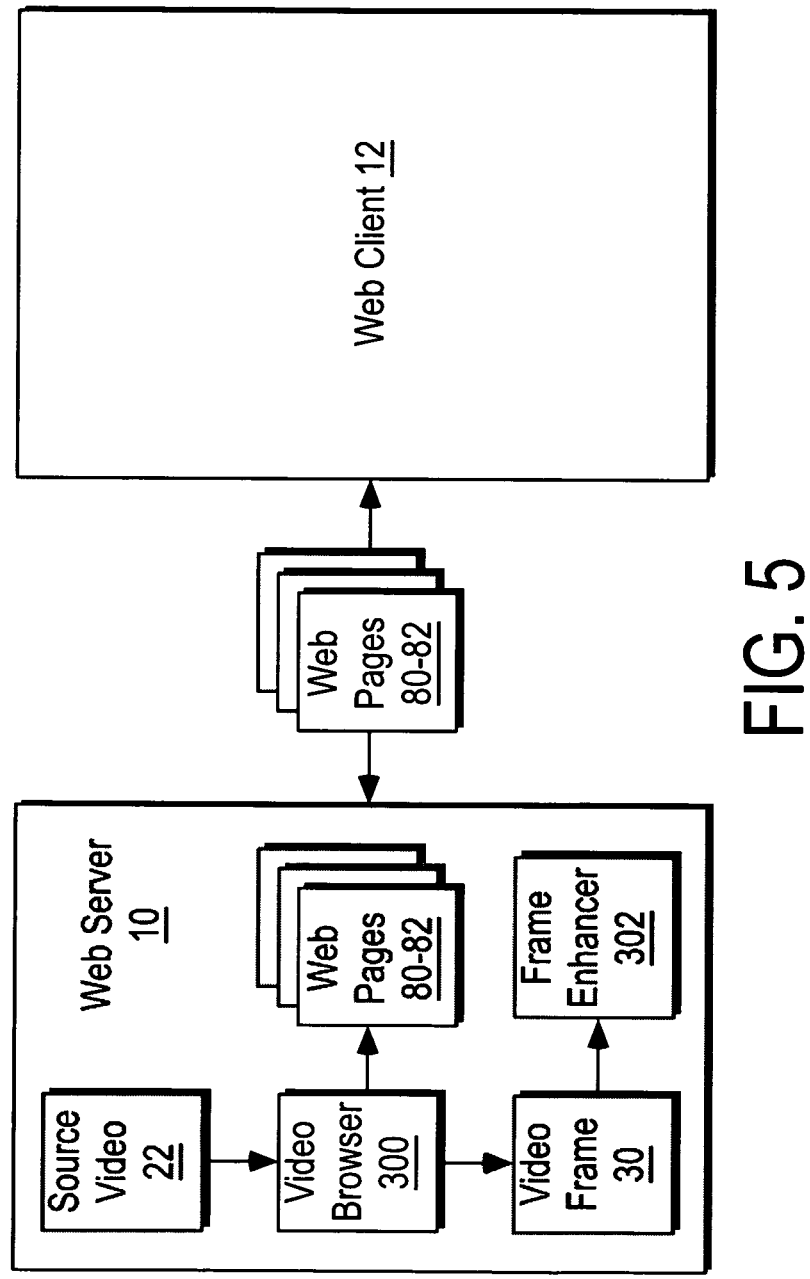

FIG. 5 shows another distribution of the video browsing functions 18 in an embodiment in which the source video 22 is stored on the web server 10. The video browsing functions 18 in this example distribution include the video browser 300 and the frame enhancer 302 located in the web server 10. The video browser 300 in this embodiment enables a user of the web client 12 to browse the source video 22 and select the video frame 30 while the source video 22 remains on the web server 10. For example, the video browser 300 generates a set of web pages 80-82 that the user of the web client 12 accesses to browse the source video 22 and select the video frame 30. The frame enhancer 302 enhances the video frame 30 once selected.

Figure 6:
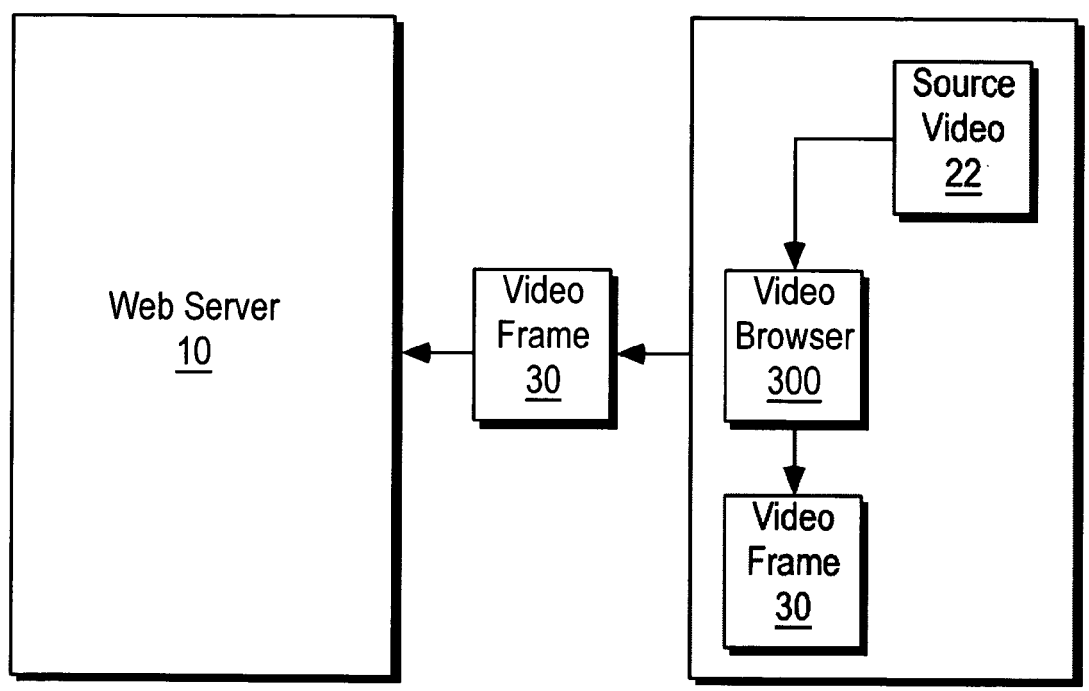

FIG. 6 shows a distribution of the video browsing functions 18 in an embodiment in which the source video 22 is stored on the web client 12. The video browsing functions 18 in this example distribution include the video browser 300 located in the web client 12. The video browser 300 enables the user of the web client 12 to browse the source video 22 and select the video frame 30 from the source video 22 while the source video 22 is on the web client 12. The video browser 300 then uploads the video frame 30 to the web server 10 for further processing, e.g. printing. The frame enhancer 302 may be located on the web server 10 or the web client 12.

The components of the video browsing functions 18 described above, e.g. the video browser 300 may be implemented using software that runs on the web server 10 and the web client 12. For example, the web client 12 may be a personal computer that is capable of running the web browser 300 implemented in software. The software that runs on the web client 12 may be pre-downloaded and installed permanently at the web client 12 or may be downloaded as needed and installed in a temporary folder on the web client 12 and then removed after a working session is finished. Alternatively, the software may run remotely from the web server 10 and operate on the source video 22 at the web client 12.

FIGS. 7a-7d illustrates a semi-automatic method for selecting the video frame 30 from the source video 22. The semi-automatic method depicted in steps 200-206 may be implemented in the video browser 300 that executes on the web server 10 or the web client 12. FIGS. 7a-7d depict a user interface display rendered to a user of the web client 12 along with corresponding user selections. The user interface displays may be rendered using, for example, a display device of the web client 12 and the corresponding user selections may be made, for example, using a keyboard/mouse of the web client 12. User selections are indicated with darkened borders.

Figure 7A:
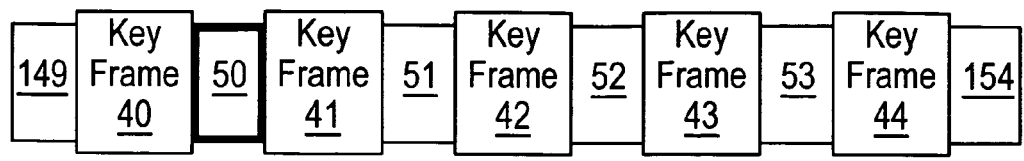
FIGS. 7a-7d illustrate a semi-automatic method for selecting a video frame.

FIG. 7a illustrates step 200 during which a set of key frames 40-44 are extracted from the source video 22. A set of blocks 50-53 located in between adjacent pairs of the key frames 40-44 represents the respective sections of the source video 22 in between the corresponding key frames. For example, the block 50 selected by the user of the web client 12 represents a section of the source video 22 located in between the key frames 40 and 41. A block 149 represents a section of the source video 22 before the key frame 40 and a block 154 represents a section of the source video 22 after the key frame 44.

Any known method for extracting a set of key frames may be employed at step 200. The number of key frames extracted at step 200 may be user-selectable or may be adaptively determined in response to the content of the source video 22.

The user of the web client 12 examines the key frames 40-44 from step 200 and decides that they subjectively prefer the portion of the source video 22 that is bounded by the key frames 40 and 41. The user of the web client 12 indicates this preference by selecting the block 50, e.g. using keyboard/mouse of the web client 12.

Figure 7B:
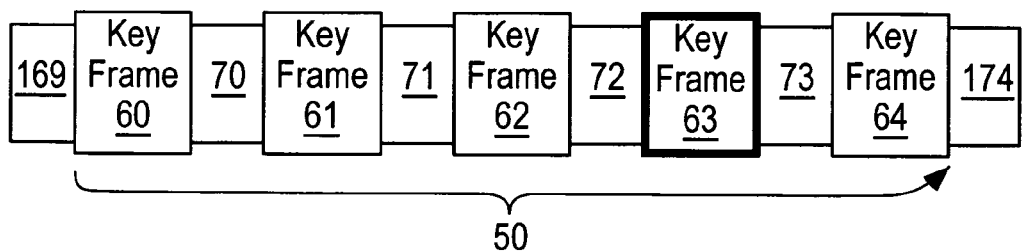

FIG. 7b illustrates step 202 during which a set of key frames 60-64 are extracted from the portion of the source video 22 that corresponds to the block 50 selected at step 200. A block 169 represents a section of the source video 22 before the key frame 60 and a block 174 represents a section of the source video 22 after the key frame 64. The key frames 60-64 show additional detail of the section of the source video 22 that corresponds to the block 50. The user of the web client 12 examines the key frames 60-64 and decides that they subjectively prefer the key frame 63. The user of the web client 12 indicates this preference by selecting the key frame 63.

Figure 7C:
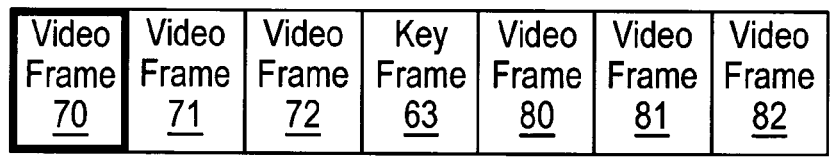

FIG. 7c illustrates step 204 during which the key frame 63 selected by the user is presented along with the set of M previous video frames 70-72 and M subsequent video frames 80-82 from the source video 22. The video frames 70-72 followed by the key frame 63 followed by the video frames 80-82 are a continuous sequence of video frames from the source video 22 without any intervening video frames. The user of the web client 12 selects the video frame 70 from among the video frames 70-72.

Figure 7D:
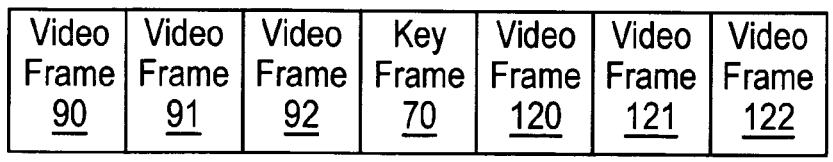

FIG. 7d illustrates step 206 during which the video frame 70 selected by the user at step 204 is presented along with a set of M previous video frames 90-92 and M subsequent video frames 120-122 from the source video 22. The user of the web client 12 selects the video frame 30 from among the video frames 90-92, the video frame 70, and the video frames 120-122.

A semi-automatic method enables a user to express the subjective desirability of the video frame 30. A semi-automatic process helps avoid imposing tedious manual operations on a user while enabling the user to obtain the best video frames according to their own subjective preferences.

The video browser 300 may select video frame 30 automatically. For example, a variety of known methods for selecting key frames from a video may be employed and the video frame 30 may be one of the extracted key frames. One example is to extract a key frame once every N frames in the source video 22. The key frames may be selected based on a content analysis of the source video 22 so that more key frames are selected from a highlight portion of the source video 22.

Alternatively, a fully manual method may be used in which the user of the web client 12 browses all of the video frames in the source video 22 to select the video frame 30.

The frame enhancer 302 may employ one or more of a variety of methods to enhance the image quality of the video frame 30. Examples include increasing the resolution of the video frame 30 by applying a super-resolution process, reducing noise and artifacts in the video frame 30 using a de-noising process, sharpening edges of the video frame 30, correcting colors in the video frame 30 with white balance, etc.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for web-based video browsing, comprising:
accessing a web server over a communication pathway;
accessing a web client over said communication pathway;
determining a bandwidth associated with said connection pathway;
determining resource availability at said web client and at said web server; and
distributing a set of video browsing functions among said web server and said web client according to said bandwidth between said web server and said web client and according to resources available at said web server and said web client such that the video browsing functions enable a user of the web client to browse a source video and select a video frame from the source video.

2. The method of claim 1, wherein distributing comprises providing a video browser on the web client that enables the user to browse the source video and extract the video frame from the source video and that uploads the video frame to the web server.

3. The method of claim 1, wherein distributing comprises providing a video browser on the web client that enables the user to browse the source video and extract the video frame from the source video and that uploads an identifier for the video frame to the web server.

4. The method of claim 1, wherein distributing comprises providing a compressor and a frame extractor on the web server and a video browser on the web client such that the web client downloads a down-sample of the source video from the compressor and the video browser enables the user to extract a down-sample of the video frame from the down-sample and then uploads an identifier for the video frame to the web server.

5. The method of claim 1, wherein distributing comprises providing a video browser on the web server that generates a set of web pages that enable the user to browse the source video and select the video frame from the source video.

6. The method of claim 1, wherein distributing comprises providing a frame enhancer on the web server that enhances the video frame once selected.

7. The method of claim 1, wherein distributing comprises providing a frame enhancer on the web client that enhances the video frame once selected.

8. The method of claim 1, wherein distributing comprises providing a video browser that extracts a set of key frames from the source video such that the user selects the video frame from among the key frames.

9. The method of claim 1, wherein distributing comprises providing a video browser that extracts a set of key frames from the source video such that the user selects the video frame from among the key frames and one or more sections of the source video that are bounded by the key frames.

10. The method of claim 1, wherein distributing comprises providing a video browsing function that enables the user to select the video frame for printing.

\* \* \* \* \*